United States Patent
Canitz

(10) Patent No.: US 9,047,390 B2
(45) Date of Patent: Jun. 2, 2015

(54) RENDERING HARDWARE ACCELERATED GRAPHICS IN A WEB APPLICATION

(75) Inventor: James Andrew Canitz, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 816 days.

(21) Appl. No.: 13/279,848

(22) Filed: Oct. 24, 2011

(65) Prior Publication Data

US 2013/0100242 A1  Apr. 25, 2013

(51) Int. Cl.
*H04N 15/00* (2006.01)
*H04N 13/00* (2006.01)
*H04N 7/18* (2006.01)
*G06F 17/30* (2006.01)
*H04N 21/4143* (2011.01)
*H04N 21/426* (2011.01)
*H04N 21/81* (2011.01)
*G06T 15/00* (2011.01)
*H04N 21/8543* (2011.01)

(52) U.S. Cl.
CPC ...... *G06F 17/30905* (2013.01); *H04N 21/4143* (2013.01); *H04N 21/42653* (2013.01); *H04N 21/816* (2013.01); *H04N 21/8543* (2013.01); *G06T 15/005* (2013.01); *G06T 2210/32* (2013.01)

(58) Field of Classification Search
None
See application file for complete search history.

(56) References Cited

U.S. PATENT DOCUMENTS

| 2010/0013842 | A1* | 1/2010 | Green et al. ............... 345/522 |
| 2010/0281107 | A1 | 11/2010 | Fallows et al. |
| 2010/0299630 | A1 | 11/2010 | McCutchen et al. |
| 2011/0178854 | A1 | 7/2011 | Sofer et al. |

OTHER PUBLICATIONS

"Internet Explorer 9.0.8112.16421", Retrieved on: Aug. 9, 2011, Available at: http://www.soft32.com/download_997.html, 3 pages.
"HTML5 Video & Media JavaScript Library", Retrieved on: Aug. 9, 2011, Available at: http://www.kaltura.org/project/HTML5_Video_Media_JavaScript_Library, 5 pages.
"Graphics in HTML5", Retrieved on: Aug. 9, 2011, Available at: http://msdn.microsoft.com/en-us/library/gg193983%28v=vs.85%29.aspx, 16 pages.

(Continued)

*Primary Examiner* — Dave Czekaj
*Assistant Examiner* — Nam Pham
(74) *Attorney, Agent, or Firm* — Steve Wight; Judy Yee; Micky Minhas

(57) ABSTRACT

The subject disclosure is directed towards providing a web application with access to hardware accelerated graphics. A rendering format for a set of video frames is established. A graphics component, which is coupled to a graphics device and associated with an unsupported file type, is identified. The graphics component generates image data compromising the hardware accelerated graphics. When the web application requests a set of video frames, the image data is transformed into the set of video frames in accordance with the format. Then, the set of frames is communicated to a display device.

20 Claims, 8 Drawing Sheets

(56) References Cited

OTHER PUBLICATIONS

Christmann, Sean, "GUIMark 2: The Rise of HTML5", Retrieved on: Aug. 9, 2011, Available at: http://www.craftymind.com/guimark2/, 21 pages.

Sangal, Puneeet, "Bringing Five Alive: Best Practices for HTML5 Video Deployment", Retrieved on: Aug. 9, 2011, Available at: http://www.streamingmedia.com/Articles/Editorial/Featured-Articles/Bringing-Five-Alive-Best-Practices-for-HTML5-Video-Deployment-73019.aspx, 6 pages.

\* cited by examiner

US 9,047,390 B2

RENDERING HARDWARE ACCELERATED GRAPHICS IN A WEB APPLICATION

BACKGROUND

Conventional media platforms (e.g., MICROSOFT® Media Foundation) support common media types/formats in an operating system. These media platforms implement a pipeline between a media file and an output device, which includes various components for reading, decoding and/or presenting the media file to the output device. Software applications may employ these media platforms to simplify media integration (i.e., video playback) and streamline video/audio rendering. The software applications may also use the media platforms to capture video/audio data, which is encoded and stored in a storage system.

The media platform pipeline may also provide video content services, such as software video/graphics processing and software video/graphics decoding. Most media platforms, however, cannot support hardware accelerated graphics processing and/or decoding because of various reasons. For instance, a lack of compatibility between these media platforms and recent web development platforms (e.g., HTML5) makes developing web applications with hardware accelerated graphics impractical. In addition, a graphics processing unit (GPU) may not support hardware accelerated capabilities. Without the ability to use the GPU to offload certain graphics operations, the web applications often render video content and/or graphics very slowly and irregularly.

With respect to the media platforms that provide some hardware graphics rendering capabilities, a desirable level of user experience quality and/or rendering performance may not be achieved. Furthermore, the hardware accelerated graphics rendering capabilities may not support certain file types (i.e., media formats). Extension models for the media platforms are designed for custom codecs and proprietary media streams and not for arbitrary hardware accelerated graphics rendering. Even if a file type is supported, the media platform does not permit user interaction with the rendered graphics. This is especially true for hardware accelerated three-dimensional (3D) video/graphics rendering inside web applications, such as HTML5 documents. Because of all these reasons, developing web applications with rendered hardware accelerated graphics is cumbersome to accomplish.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards rendering hardware accelerated graphics in a web application. In one aspect, a video stream extension is implemented for a file type that is not supported by a media platform. The video stream extension is registered with the media platform as a scheme handler of the file type. Instead of using a media platform pipeline component (i.e., a codec known as a media transform), the video stream extension may operate an application-specific rendering component for the file type known as a graphics component in order to retrieve hardware accelerated graphics in the form of resources and/or render targets. Image data within the resources (e.g., texture arrays or vertex buffers) or render targets (e.g., drawing surfaces) are transformed into a set of video frames in accordance with a rendering format. In another aspect, the video stream extension allocates video samples using the set of video frames, which are communicated to another media platform pipeline component and presented on a display device.

In one aspect, the graphics component is implemented to use a graphics device to produce texture resources and/or drawing surfaces comprising hardware accelerated graphics, such as three-dimensional hardware accelerated graphics. The graphics component serves as an intermediary between the video stream extension and the graphics device. In one implementation, the graphics component is not one of the media platform pipeline components, and thus such an implementation of the graphics component is not confined to a pre-defined interface specification. In another aspect, images stored within the texture resources are formatted in accordance with at least a portion of the video frame rendering format, which is determined by the web application.

In one aspect, the graphics component exposes one or more functions that are projected to the web application via a runtime mechanism. The resulting interface from such a projection is known as an interaction component. The one or more functions are configured to control the graphics component. When the web application invokes function calls, the graphics component manipulates the image data and creates a new set of hardware accelerated graphics to be presented on the display device within an output rendering of the web application.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
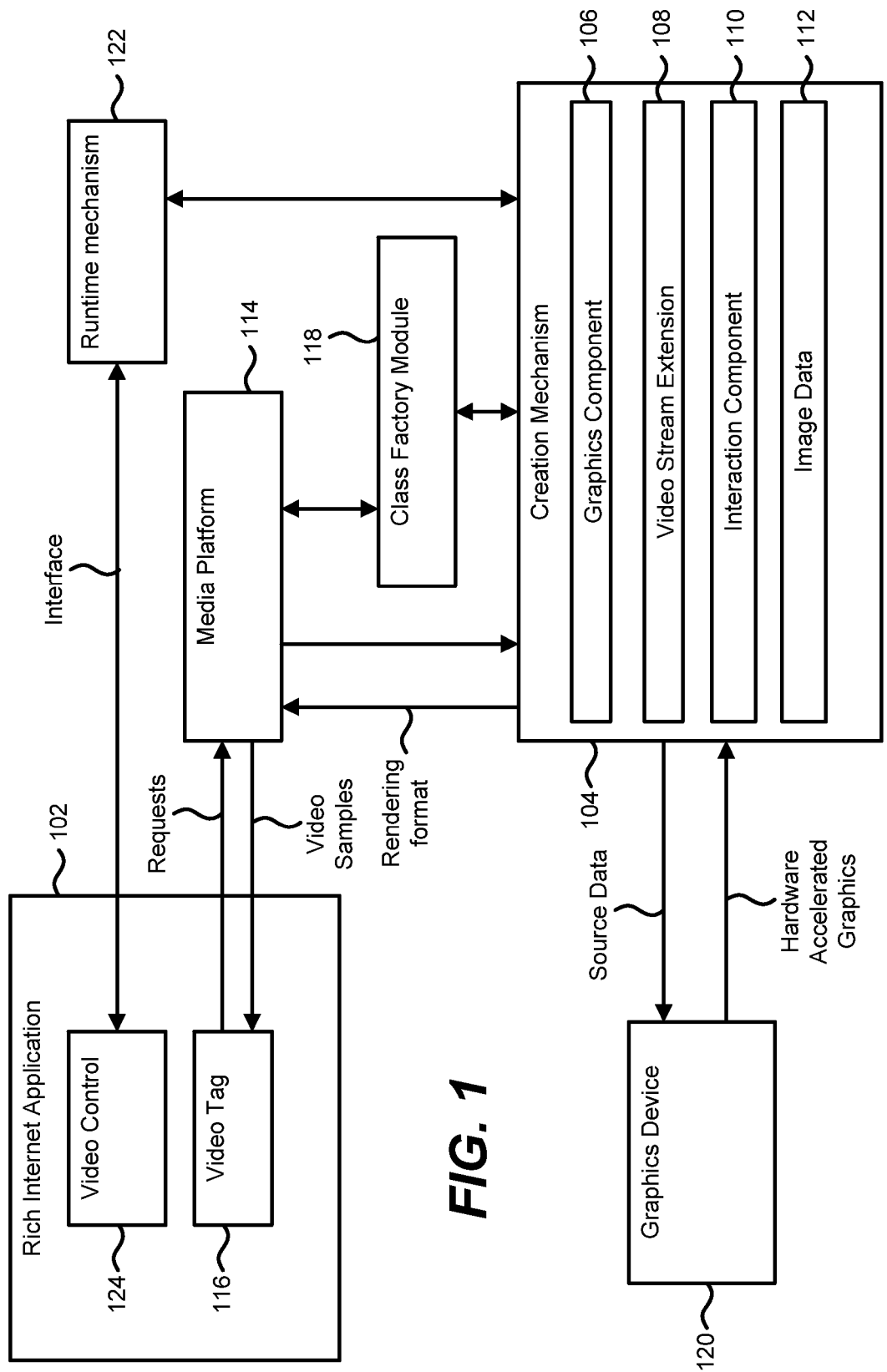
FIG. 1 is a block diagram illustrating an exemplary system for providing a web application with access to hardware accelerated graphics according to one example implementation.

Various aspects of the technology described herein are generally directed towards providing a web application with access to hardware accelerated graphics. In one exemplary implementation, a video stream extension is instantiated when the web application recognizes a video tag for a certain file type. However, a media platform for the web application is not designed for hardware accelerated graphics rendering for unsupported file types. In order to bypass inappropriate media transforms on the media platform, the video stream extension routes video sample requests from the web application to a custom rendering component for the certain file type known as a graphics component.

In one exemplary implementation, the video stream extension also provides the custom rendering component with an empty resource or render target, such as a two-dimensional texture or a drawing surface, respectively. The custom rendering component uses hardware accelerated services provided by a graphics device to render hardware accelerated graphics to image data, which is returned to the video stream extension in the form of a non-empty drawing surface or the 2D-texture resource comprising the non-empty drawing surface. After this drawing surface is converted into a media buffer, the video stream extension transforms the media buffer into a video sample. Similarly, the video stream extension extracts the drawing surface from the 2D-texture resource and allocates the video sample. The video stream extension communicates the video sample to a display device and returns an event to the web application indicating a completion of the video sample request.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and graphics rendering in general.

FIG. 1 is a block diagram illustrating an exemplary system for providing a web application with access to hardware accelerated graphics according to one example implementation. Exemplary components of the exemplary system include a web application 102 and a creation mechanism 104.

The web application 102 may include a combination of browser-supported software code (e.g., JavaScript) and browser-rendered markup language (e.g., HTML5) that provides a user with some functionality. Deploying the web application 102 utilizes one or more development platforms (e.g., HTML5, MICROSOFT® Silverlight and/or like). In one exemplary implementation, the web application 102 may include a rich Internet application that operates in a similar manner as desktop application software and interacts with the user via a browser. The web application 102 may be a component (e.g., a plug-in) of the browser.

According to one exemplary implementation, the creation mechanism 104 may include various components, such as a graphics component 106, a video stream extension 108, an interaction component 110 and image data 112, which, in cooperation with a media platform 114, provide the web application 102 with accelerated graphics hardware functionality. As described herein, the media platform 114 (e.g., MICROSOFT® Media Foundation) enables the development of web applications and other applications for using digital media on an operating system. Furthermore, the media platform 114 may include an end-to-end pipeline that handles data flow from source data to a destination, such as a display device.

In one exemplary implementation, the creation mechanism 104 registers the video stream extension 108 with the media platform 114 as a provider of data of a particular file type (e.g., a MIME type). Hence, when the web application 102 recognizes a video tag 116 associated with the particular file type, the browser retrieves such data from the video stream extension 108. In one exemplary implementation, the web application 102 issues requests for a video stream to the media platform 114, which instantiates the video stream extension 108 via a class factory module 118 and/or relays the requests to the video stream extension 108.

The video stream may correspond with the media platform 114 media type and includes video/image frames. Typically, this media type (e.g., MIME types or content types) is associated with a classification system used to identify video files/streams. The media type may refer to a format for rendering or presenting the video frames on a display device. The video stream extension 108 renders the video frames according to such a format. When communicated to the media platform 114, the video frames may or may not be stored within proprietary containers, such as video samples.

The video tag 116 generally includes a script (e.g., software code) that requests the browser to load video content (i.e., a file or stream) from a location (e.g., a Uniform Resource Identifier (URI) or Uniform Resource Locator (URL)) according to one exemplary implementation. The video tag 116, for example, may be an HTML5<video> tag that specifies an embedded video on an HTML5 document to which visitors may watch and listen. The video tag 116 also includes attributes that control how the video is to be played and/or specify events that, when occur, cause the browser to invoke another script from within the HTML5 document.

The class factory module 118 may refer to a design pattern under Component Object Model (COM) (e.g., a binary interface standard for enabling inter-process communication) and may use various .NET features such as reflection, interfaces, dynamic class/object creation and/or the like. The class factory module 118 may be an object that enables the media platform 114 or another application to instantiate objects dynamically from an arbitrary class pool, such as the creation mechanism 104 and/or the exemplary components thereof. The media platform 114 may assign the class factory module 118 to a particular media type through a local registration such that the creation mechanism 104 is available to the web application 102 but is not available to another web application. Alternatively, the class factory module 118 may be registered with a system registry. During source resolution of the video tag 116, locally registered objects take precedence over objects that are registered in the system registry.

In one exemplary implementation, the class factory module 118 may be a helper object known as an activation object, which defers instantiation of the creation mechanism 104 until the video tag 116 requests a video stream. After determining a file type of the requested video stream, the media platform 114 may load an implementation of the creation mechanism 104 that comprises the appropriate graphics component 106 that corresponds with such a file type, which is not supported by the web application 102 and the media platform 114 components other than the video stream extension 108.

In one exemplary implementation, the graphics component 106 may be configured to use a graphics device 120 to perform hardware accelerated graphics operations exclusively on data of this file type. Accordingly, the graphics component 106 may be restricted to one or more applications that use the file type (i.e., application-specific). For example, the file type may refer to a three-dimensional avatar (i.e., an .avatar file) for a gaming console (e.g., MICROSOFT® Xbox) for which the graphics component 106 may be a custom rendering component that is designed to operate on a desktop computing environment. The graphics component 106 may use various graphics APIs (e.g., MICROSOFT® Direct3D 11, Direct2D and/or the like) to provide hardware-accelerated two-dimensional and three-dimensional graphics for rendering the avatar and hence, may not be implemented to directly operate with the media platform 114 or any component thereof. Instead, the graphics component 106 may function as a proxy or intermediary component between the video stream extension 108 for the avatar and various accelerated hardware capabilities provided by the graphics device 120 as described herein.

The graphics device 120 generally includes various hardware and/or software components that support various graphics functionality, such as primitive-based or vector graphics rendering, animation creation, multimedia integration, content composition and/or the like. A typical embodiment of the graphics device 120 includes the graphics processing unit (GPU), which coordinates with other processors (e.g., a CPU) and dedicated memory (e.g., display memory) to enable the development of user interfaces/controls, video/image content, animations and/or the like. In addition, the graphics device 120 may also enable three-dimensional (3D) graphics functionality including drawing, transforming and/or animating three-dimensional graphics. Furthermore, the graphics device 120 provides hardware accelerated graphics (i.e., objects or entire scenes), which are transmitted to an output device, such as the display device (i.e., a monitor).

In one exemplary implementation, after the graphics device 120 generates the hardware accelerated graphics by creating a scene, blending surfaces, drawing geometry and/or the like, the graphics component 106 may render these graphics to the image data 112 (e.g., a drawing surface). The hardware accelerated graphics may result from the execution of various graphics processing unit (GPU) commands including per-vertex operations, per-primitive operations, per-pixel operations and/or the like. The creation mechanism 104 may communicate the image data 112 to the display device in a form of video frames or proprietary video samples.

According to one exemplary implementation, in addition to creating an object for the graphics component 106, the creation mechanism 104 instantiates the video stream extension 108, which may include various media platform 114 objects, such as a handler object, a media source and a media stream, as described herein. The video stream extension 108 may be implemented to establish a rendering format for a set of video frames that are converted from source data associated with the file type. The web application 102 may provide one or more attributes that define the rendering format. An example rendering format of each video frame may include a width (in pixels), a height (in pixels), a number of bits, an aspect ratio, a frame rate, various modes and/or the like.

In one exemplary implementation, the video stream extension 108 may be implemented to communicate with the graphics component 106 and retrieve the image data 112 in the form of resources, such as a texture resource, and/or rendering target, such as a drawing surface. For example, the texture resource may be used as a container for the drawing surface in which case the video stream extension 108 extracts the drawing surface, which is transformed into a video frame and/or stored in a video sample.

In another exemplary implementation, the creation mechanism 104 instantiates the interaction component 110 comprising interface functions for controlling the graphics component 106. Some of these interface functions modify the image data 112 in response to user interaction with the video stream being presented on the web application 102. Via the interaction component 110, for example, the web application 102 may control animation functionality over the video stream. The web application 102 may start, seek or restart an animation by specifying where to start a playback and the graphics component 106 creates transformation images from this position.

A runtime mechanism 122 projects the interaction component 110 onto the web application 102 by binding the interface functions to complementary functions in another programming language. These bindings may be represented by common COM events. Therefore, the web application 102 may include a component running in JavaScript known as a video control 124 that invokes one or more of the interface functions even though the interaction component 110 is built on C++ or C. For example, the video control 124 may communicate one or more common COM-events to the interaction component 110.

In one exemplary implementation, the runtime mechanism 122 may be an application programming model for an operating system. The runtime mechanism 122 (e.g., MICROSOFT® Windows Runtime (WinRT)) enables interfacing between different programming languages and platforms. For example, the runtime mechanism 122 may include an execution environment and a collection of application programming interfaces (APIs) that provide access to operating system functionality. In one exemplary implementation, the runtime mechanism 122 may provide an object-oriented class-based type system that is built on metadata and may support constructs on the interaction component 110 with corresponding constructs that are found in the .NET framework (e.g., classes, methods, properties, delegates and events). Classes for the interface functions may be compiled to target the runtime mechanism 122 and may be written in any supported language and for any supported platform. Class metadata permits these compiled functions to interface with compiled versions of the complementary functions from any other programming language.

In one exemplary implementation, the runtime mechanism 122 projects the interaction component 110 to the execution environment being used by the web application 102, which is typically JavaScript. Generally, a projection is a process of exposing (i.e., binding) a user interface or a library to a plurality of execution environments: Native (C and C++), HTML/JavaScript and .NET. Hence, a component authored in C++ or a .NET language, such as the interaction component 110, may be consumed within all of the execution environments. In addition, the runtime mechanism 122 creates bindings to C or C++ libraries that may be exposed to C# as object-oriented libraries.

In another exemplary implementation, the runtime mechanism 122 also includes a XAML-based User Interface (UI) system that is available to C++ developers, HTML/Javascript developers and .NET developers. Accordingly, user interfaces for C++ may be initially written in XAML and then, ported to the C++ execution environment where both implementations are compiled to native x86. The user interfaces are exposed as objects that C# and Visual Basic may consume directly. Because the user interfaces are written in C++ and support reflection, dynamic languages, such as JavaScript, may use them efficiently.

Figure 2:
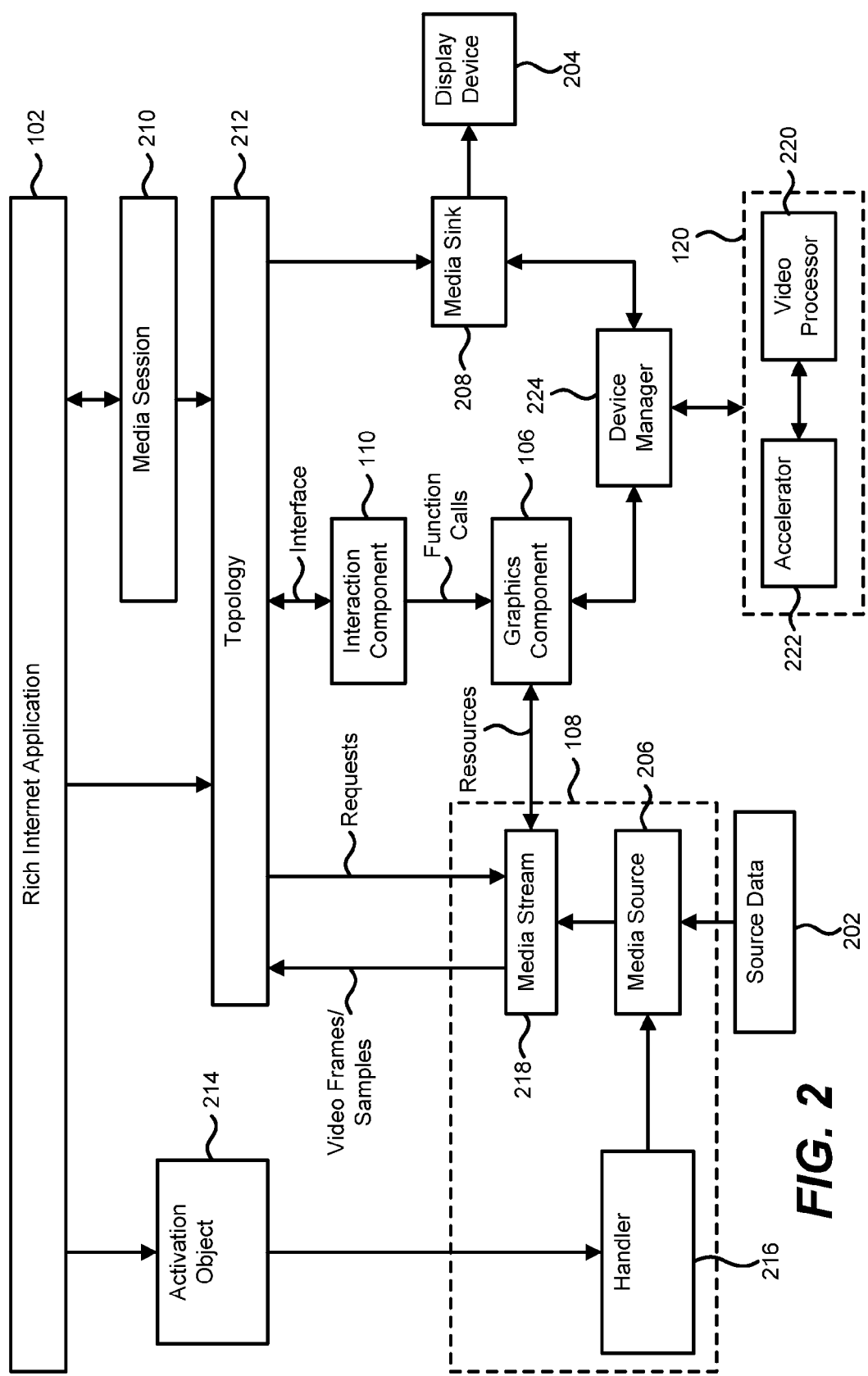
FIG. 2 is a block diagram illustrating an exemplary system for implementing a video stream extension within a media platform according to one example implementation.

FIG. 2 is a block diagram illustrating an exemplary system for implementing a video stream extension within a media platform according to one example implementation. An exemplary media platform may be the media platform 114 of FIG. 1 and may include a COM-based multimedia framework pipeline and infrastructure platform for digital media in various operating systems. The pipeline in media platform is the only layer of the architecture that directly generates or processes media data.

An exemplary media platform architecture may be partitioned into a plurality of layers. A first layer encapsulates an end-to-end pipeline that handles data flow from source data 202 (e.g., a video file) to a display device 204 (e.g., a monitor), which comprises a plurality of components including a media source 206 and a media sink 208. The media source 206 may be an object that provides media data. The media sink 208 may be an object that consumes the media data, which is presented on an output device, such as the display device 204 or stored as a file on a persistent storage system. Typically, the media data communicated between the media source 206 and the media sink 208 may be transformed into a different form by various media transforms (e.g., a decoder, an encoder, a digital signal processor (DSP) and/or the like). In one exemplary implementation, the graphics rendering component 106 transforms the media data into video frames instead of the various media transforms.

A media session 210 may be an object that manages the data flow within the media platform and controls video stream playback on behalf of the web application 102. The media session 210 may also create an object that is known as a topology 212 that represents the data flow within the media platform pipeline. The media session 210 may use an activation object 214 to create an instance the media source 206 from an URI, a file or a byte stream.

In one exemplary implementation, the instantiation of the media source 206 may be achieved by implementing a helper object that corresponds with a form of the source data 202 and is depicted as a handler 216. For example, the activation object 214 instantiates a scheme handler that accepts a URL or file location as input and creates the media source 206. If the source data 202 is a byte stream, the activation object 214 may create a byte stream handler instead. In an alternative implementation, the media session 210 may use a source resolver object to instantiate the media source 206. For example, the source resolver object may examine a system registry and identify the handler 216 associated with a URL scheme.

The handler 216 may define a format for rendering the video stream by configuring a media source presentation descriptor and a stream descriptor. Such a format is used by the media platform to present the video stream on the display device 204. For example, the format may define the video stream as a set of 32 bit RGB images/video frames that are 640 pixels wide by 480 pixels tall (FRAME_WIDTH_PX and FRAME_HEIGHT_PX) at about 30 frames per second (FRAMES_PER_SEC). The media session 210 is now ready to render hardware accelerated graphics and display the video stream by calling exposed methods/functions on the media source 206.

Typically, the media source 206 represents one or more streams in which each stream delivers media data of one type, such as audio or video. In one exemplary implementation, a media stream 218 provides a video stream for the media source 206. The media stream 218 is created when the media session 210 starts the media source 206. A video frame format for the video stream may be stored in a stream descriptor within the media stream 218. Via the media session 210, the web application 102 may call functions on the media stream 218 and requests video samples from the media stream 218. For each new video sample, the media stream 206 sends an event along with the new video sample to the media session 210.

In one exemplary implementation, the graphics component 106 may be an application-specific rendering component that operates as a proxy to hardware-accelerated functionality on the graphics device 120. Such functionality may be provided by a video processor 220 and/or an accelerator 222. The video processor 220 supports GPU-accelerated video processing (e.g., using MICROSOFT® Direct3D version 11 or later). For example, the graphics component 106 may utilize the video processor 220 to perform various video processing operations (e.g., color space conversion, video resizing, de-interlacing, frame rate conversion, rotation, cropping, spatial left and right view unpacking and mirroring) on the source data 202.

The accelerator 222 represents a hardware accelerator for the graphics device 120 (e.g., a Direct3D device). As an example, the graphics component 106 may utilize the accelerator 222 to perform various hardware-accelerated graphics operations (e.g., decoding, media sample allocating and/or the like) on the source data 202. As another example, the graphics component 106 may use the accelerator 222 to speed up operations performed by the video processor 220 and/or offload CPU-intensive operations to the GPU.

In one exemplary implementation, the graphics component 106 may be implemented to use with an interface (e.g., various DirectX APIs) that provides high-fidelity, hardware-accelerated graphics capabilities. When conventional media transforms are unable to support these capabilities, the graphics component 106 provides the rich-Internet application 102 and/or the media platform with access to such an Interface. For example, the graphics component 106 may be a Direct3D-aware component if the graphics component 106 is able to process and/or allocate video samples that include (Direct3D) resources, such as drawing surfaces or texture resources. Supporting Direct3D provides the video stream extension 108 with access to the hardware-accelerated graphics operations that are implemented by various APIs, such as Direct3D 11 Device Driver Interface (DDI) and/or the like.

With respect to hardware graphics rendering, a resource in general comprises an area in memory that may be accessed by the graphics device 120 (e.g., MICROSOFT® Direct3D device). In order for the graphics device 120 to access memory efficiently, data that is provided to or provided by the graphics device 120 (e.g., input geometry or geometry-oriented resources, shader resources, drawing surfaces, texture resources and/or the like) is stored as the resource. Each resource derives from two or more fundamental resource types, such as a buffer and a texture. In one exemplary implementation, components of the graphics device 120 create resources of various types. Examples of the various resource types include the following: vertex buffers, index buffers, constant buffers, texture arrays, surface buffers and shader resources. Other forms of resources may include maps, such as mipmaps, cube maps, volume maps, environmental maps and/or the like. An environment map is used to texture-map scene geometry to provide a more sophisticated scene without using complex geometry.

In order to manage a collection of texel data, the graphics device 102 provides the graphics component 106 with a texture resource. A texel is a fundamental unit of texture space and may be referred to as a texture element or texture pixel. A texture array may include one or more texture resources, having a same type and dimensions, which may be indexed from within the graphics component 106 or the media sink 208. Each texture resource may be used as a render target or a depth-stencil resource. An example texture resource may be a drawing surface (e.g., a DirectX surface). Hence, each drawing surface within a row of the texture array may serve a different purpose when rendering a video frame. As an alternative, the drawing surface may be stored in a type of media buffer known as a surface buffer.

In one exemplary implementation, after rendering hardware accelerated graphics to the drawing surface (e.g., a MICROSOFT® DirectX Graphics Infrastructure (DXGI) surface), the graphics component 106 may store the drawing surface within the texture array, which is communicated to the media stream 218. Drawing surfaces may be used in a variety of ways, such as rendering targets, and may include a two-dimensional area of pixel values. After the graphics component 106 communicates the texture array, the media stream 218 queries the texture array for an interface, such as an IID3D11Texture2D interface, through which the media stream 218 retrieves the drawing sample.

In order to provide the media sink 208 with a video sample, the media stream 218 creates a buffer (e.g., a DXGIBuffer) that represents the drawing surface for a surface type, such as IID_ID3D11Texture2D, according to one exemplary implementation. Depending on a rendering format stored within a stream descriptor, the media stream 218 copies the single image or video frame into the buffer in a top-down format, which is compatible with MICROSOFT® Direct3D, or a bottom-up format. Then, the media stream 218 allocates the video sample using the single image or video frame.

In one exemplary implementation, the media sink 208 includes various objects, such as a mixer and a video presenter. The mixer receives the video samples from the media stream 218 and extracts a set of video frames. The mixer may also utilize the video processor 220 to perform deinterlacing and color correction. The video presenter may receive the set of video frames (typically from the mixer or directly from the media stream 218) and renders the set of video frames to the display device 204 according to the video frame format, which is defined by the media stream 218 (e.g., in the stream descriptor).

In one exemplary implementation, the graphics component 106 may use a command list to generate hardware accelerated graphics. The command list includes a sequence of various GPU commands that may be recorded and played back by the graphics device 120. These GPU commands may be generated using a device context associated with the graphics device 120. The device context generally refers to a circumstance or setting in which the graphics device 120 may be used. The device context describes resources owned by the graphics device 120 and may be used to set a graphics pipeline state.

In one exemplary implementation, the device context includes an interface that may manage various graphics pipeline stages (e.g., a vertex shader, a geometry shader, a pixel shader and/or the like), execute commands in a compute shader, draw primitives and/or the like. The graphics component 106 uses such an interface to create render targets (i.e., image data) comprising hardware accelerated graphics. The graphics component 106 extracts the device context associated with the graphics device 120 from memory operated by a device manager 224 and examines GPU commands that are supported by a graphics driver. The graphics component 106 selects one or more appropriate GPU commands and generates the command list to be executed on the graphics device 120.

As a response, the graphics device 120 creates a video processor render target, such as a drawing surface, according to one exemplary implementation. The video processor 220 may define, in pixels, a width and a height of the drawing surface as well as a pixel format. In addition, the video processor 220 may set a drawing surface format. After performing a video processing operation on the source data 202, the video processor 220 writes results to a drawing surface. The accelerator 222 may improve performance of the video processor 222 and/or may apply various accelerated decoding operations during the drawing surface rendering.

The video stream extension 108 may transform the drawing surface into a video frame and create a video sample from the video frame. For example, the video stream extension 108 may adjust an aspect ratio to match the rendering format for the video frame. The video sample refers to a specific media sample implementation and a container object for the video frame. Each media sample type contains zero or more media buffers. The buffers are maintained in an ordered list and accessed by index value.

The graphics component 106 may instruct the device manager 224 (e.g., a MICROSOFT® DirectX Graphics Infrastructure (DXGI) Device Manager) to allocate video samples from texture resources and/or drawing surfaces. The graphics component 106 specifies the number of samples to allocate and the rendering format for the video frames within the video samples. The device manager 226 may create an allocator object to produce the video samples, which are consumed by the media sink 208 and presented to the display device 204.

In one alternative exemplary implementation, because the graphics component 106 is an application-specific component for the source data 202 format, the graphics component 106 may supply a custom implementation of the video presenter to the media sink 208. Such an application-specific implementation operates as an intermediary between the media sink 208 and various graphics acceleration services that are provided by the accelerator 222 and/or the video processor 220. The video presenter uses the graphics 120 device to extract video frames from the video samples and perform various operations (e.g., accelerated decoding and/or accelerated video processing) in order to render the video frames onto the display device 204.

Furthermore, the video presenter instantiates the device manager 224 for the purpose of operating the accelerator 222 and/or the video processor 220. The device manager 224 in general enables two threads, such as the graphics component 106 and/or the media sink 208, to share a logical version of the graphics device 120 (e.g., MICROSOFT® Direct3D 11 device). For example, the device manager 224 may an instance of the MICROSOFT® DXGI Device Manager. This logical version may provide some of the functionality implemented by a driver for the graphics device 120.

As described herein, the interaction component 110 projects interface functions exposed by a custom rendering component, such as the graphics component 106. Via the web application 102, a user may call some of these interface functions by interacting with image data being displayed. For example, the web application 102 may desire to change the clothing on a three-dimensional avatar that is produced by the graphics component 106. When the web application 102 invokes a corresponding function call on the interface, the graphics component 106 uses the graphics device 120 to render hardware accelerated graphics to new image data (e.g., a resource), which illustrates a new set of clothes. As another example, a user may instruct the three-dimensional avatar to perform an animation. In response to this user interaction, the web application 102 invokes an appropriate function call to which the graphics component 106 responds with a set of images illustrating movement of the three-dimensional avatar.

Figure 3:
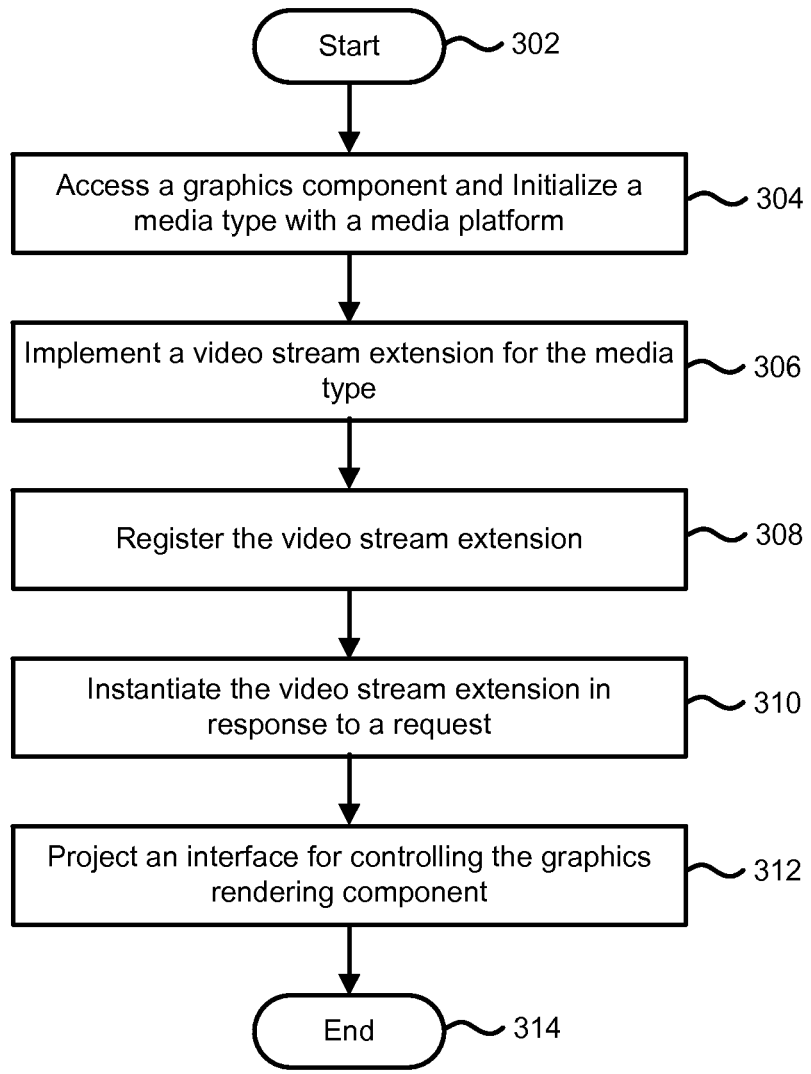
FIG. 3 is a block diagram illustrating exemplary steps for providing a web application with access to hardware accelerated graphics according to one example implementation.

FIG. 3 is a block diagram illustrating exemplary steps for providing a web application with access to hardware accelerated graphics according to one example implementation.

Steps depicted in FIG. 3 commence at step 302 and proceed to step 304 when the creation mechanism 104 accesses a graphics component and initializes a media platform with a media type. In one exemplary implementation, the media type may describe a custom video stream associated with a specific rendering component known herein as the graphics component, such as the graphics component 106 of FIG. 1. Typically, the graphics component is used render the custom video stream on a native software application (e.g., a proprietary web application running on a home web portal), but may be operated by any other web application that desires hardware-accelerated graphics as described herein.

Step 306 is directed to implementing a video stream extension for the media type. In one exemplary implementation, the creation mechanism 104 defines a rendering format of a set of video frames forming the custom video stream, which is stored in various descriptors. The creation mechanism 104 also couples the video stream extension, such as the video stream extension 108 of FIG. 1, with an object implementing the graphics component. The creation mechanism 104 implements one or more functions that process resources provided by the graphics component and create the video frames. Some of these functions may also wrap the set of video frames into video samples that are consumable by the media platform.

Step 308 refers to registering the video stream extension with the media platform. In one exemplary implementation, the creation mechanism 104 generates an object (e.g., an activation object) that defers instantiation of the video stream extension until the web application recognizes a video tag for the media type. The creation mechanism 104 may register the video stream extension as a local handler for a URI scheme associated with the media type such that the video stream extension may not be used by another application.

Step 310 represents an instantiation of the video stream extension in response to a request. When the web application initiates requests for video samples having the media type, the creation mechanism 104 produces one or more objects that constitute the video stream extension, such as a scheme handler, a media source and a media stream. The media source reads bytes from source data (e.g., content that is stored locally and/or downloaded from the URI) and prepares the media stream to complete the video sample requests.

Step 312 is directed to projecting an interface for controlling the graphics component. In one exemplary implementation, the creation mechanism 104 exposes functions provided by the graphics component 106 to the web application through a runtime mechanism. The exposed functions form an interaction component, such as the interaction component 110 of FIG. 1, and manipulate the custom video stream in response to user interactions with the web application. Step 314 terminates the steps described in FIG. 3.

Figure 4:
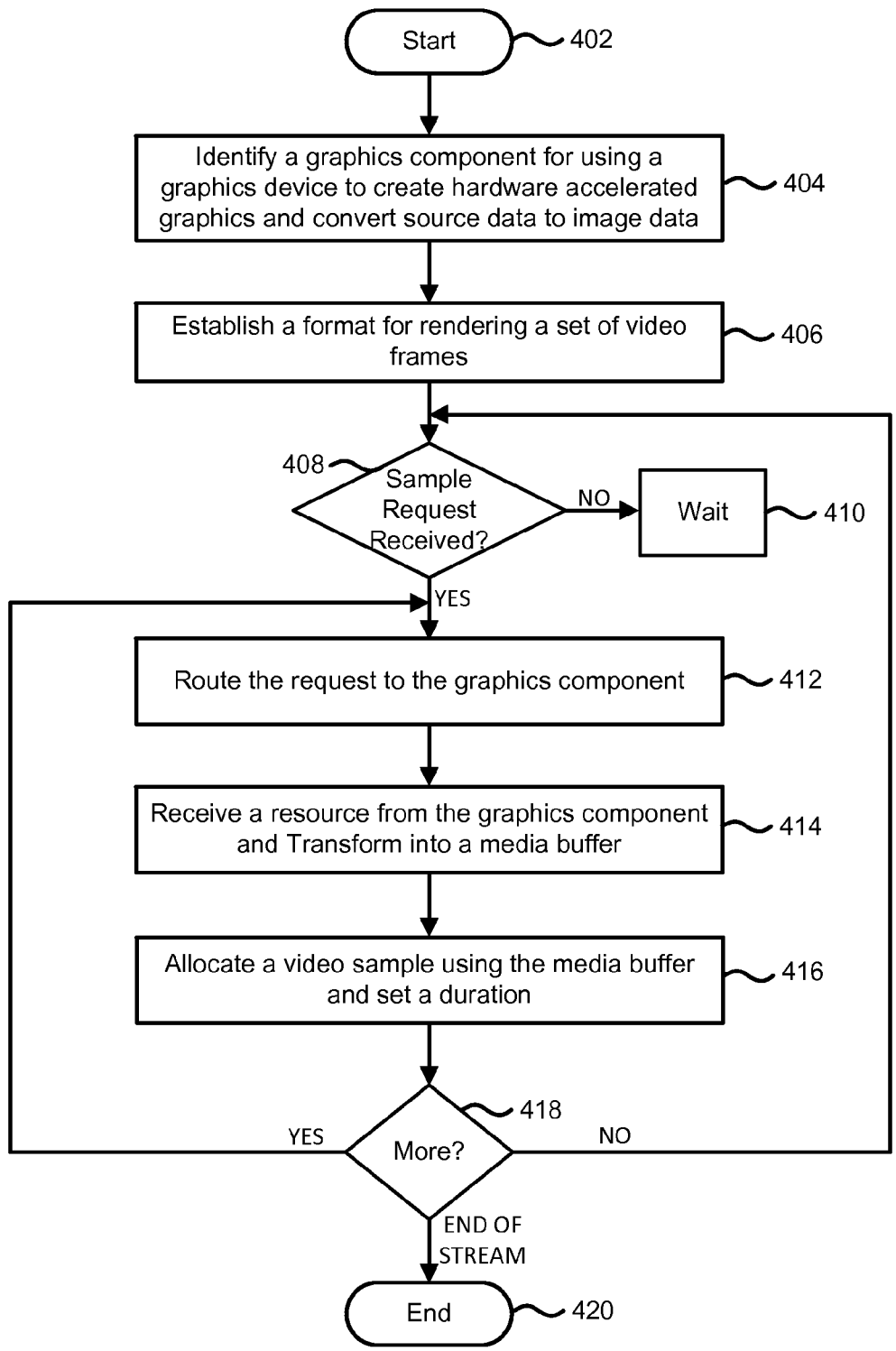
FIG. 4 is a flow diagram illustrating exemplary steps for implementing a video stream extension that uses a graphics device to perform hardware accelerated graphics operations on source data according to one example implementation.

FIG. 4 is a flow diagram illustrating exemplary steps for implementing a video stream extension that uses a graphics device to perform hardware accelerated graphics operations on source data according to one example implementation. Steps depicted in FIG. 4 commence at step 402 and proceed to step 404 when the video stream extension 108 identifies a graphics component for using a graphics device to create hardware accelerated graphics and convert source data associated with a custom media type into image data. The graphics component functions as an intermediary between the video stream extension and hardware accelerated services that correspond to the graphics device.

Step 406 refers to establishing a format for rendering a set of video frames onto an output device, such as a display device. An example format may define a number of video frames within a time period, a number of bits per video frame, known video/image formats that are potentially within each video frame and/or other attributes. Step 408 is directed to a determination as to whether a sample request is received from the web application. If such a request has not arrived, the video stream extension waits at step 410. For example, the web application may issue the sample request every thirty seconds.

As soon as the sample request is received, step 408 or step 410 proceeds to step 412 where the video stream extension routes the request to the graphics component along with a portion of the source data and the rendering format. As described herein, the graphics component uses the graphics device to perform various hardware accelerated graphics operations on the source data.

Step 414 is directed to receiving an image from the graphics component in a form of a resource and transforming the resource into a media buffer. In one exemplary implementation, the image may be a drawing surface embedded within a two-dimensional texture array. The video stream extension 108 extracts the drawing surface from the two-dimensional texture array and stores the drawing surface within the media buffer.

Step 416 is directed to allocating a video sample using the media buffer and setting a duration for the video sample. In one exemplary implementation, the video stream extension 108 creates an allocator object that consumes the media buffer and produces the video sample set to a specific time period. Accordingly, the display device presents the video sample for the specific time period. In another exemplary implementation, the video stream extension 108 creates the video sample from the media buffer (e.g., a surface buffer) using a pre-defined function in the media platform.

Step 418 refers to a determination as to whether there are more video samples to produce based on the rendering format. For example, there may be more sample requests remaining in a queue to be fulfilled. These sample requests may have been sent while the video stream extension was allocating a previous video sample. If there are additional sample requests to complete, the steps described in FIG. 4 return to step 412. If there are no more sample requests in the queue, the steps described in FIG. 4 return to step 408. On the other hand, if an "end of stream" condition is observed, the steps described in FIG. 4 proceeds to step 420. For example, a media source may return an end of stream event to a media stream signifying no more source data to be rendered. Alternatively, the steps described in FIG. 4 may return to step 408 and await user interaction via interface functions provided by the graphics component. Step 420 is directed to terminating the steps described in FIG. 4.

Figure 5:
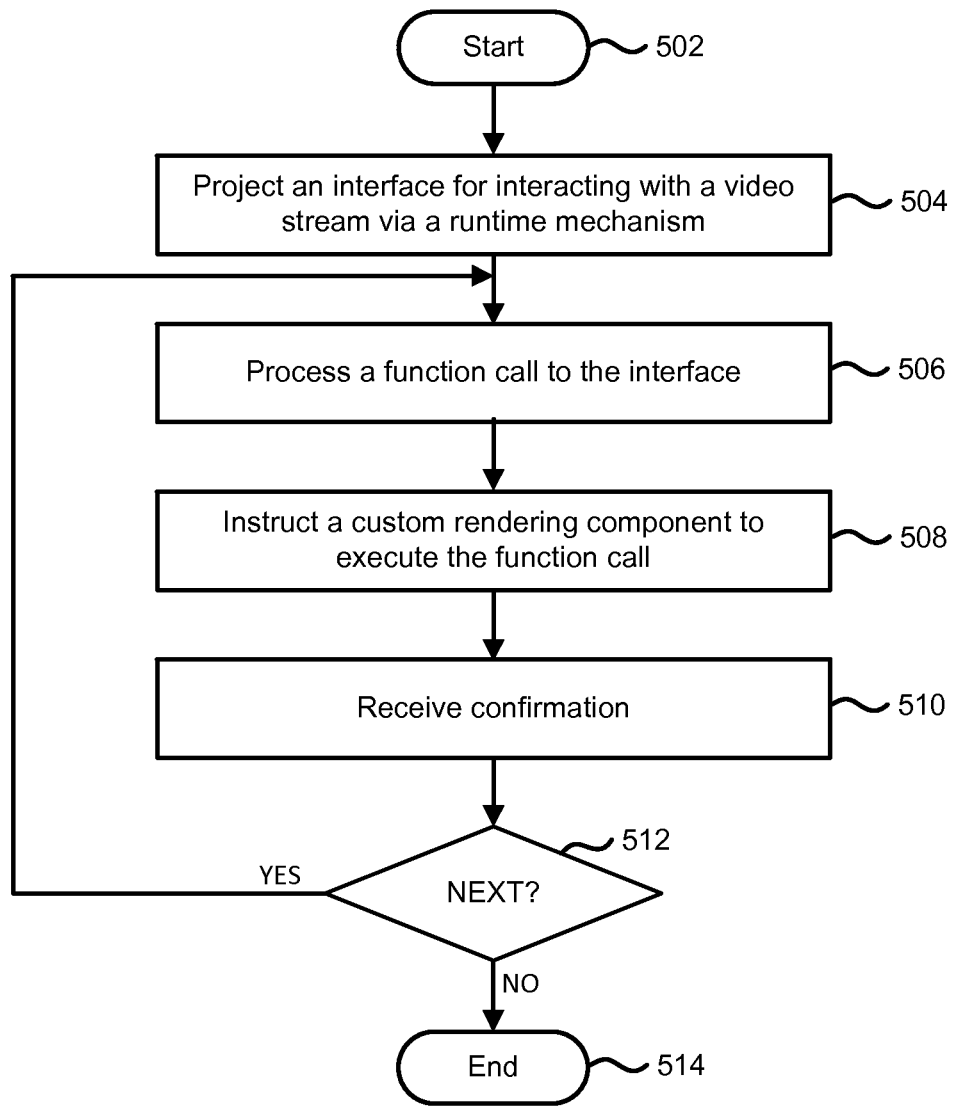
FIG. 5 is a flow diagram illustrating exemplary steps for exposing interface functions for manipulating image data to a web application according to one example implementation.

FIG. 5 is a flow diagram illustrating exemplary steps for exposing interface functions for manipulating image data to a web application according to one example implementation. Steps depicted in FIG. 5 commence at step 502 and proceed to step 504 when the interaction component 110 projects an interface for interacting with a video stream via a runtime mechanism.

As described herein, the interaction component 110 includes various functions exposed by a custom rendering component for the video stream, such as the graphics component 106. These functions are used to control operations performed by the custom rendering component. In order for these accessible to the web application, the runtime mechanism binds the functions to complementary functions in another programming language. For example, the functions may be implemented in C++ and projected into JavaScript enabling JavaScript software code running within the web application to invoke function calls.

Step 506 is directed to processing a function call to the interface. Step 508 is directed to instructing the graphics component to execute the function call. In one exemplary implementation, for each function call, the interaction component 110 routes the function call to the custom rendering component, which performs necessary hardware accelerated graphics operations for modifying the image data. When a video stream extension, such as the video stream extension 108 of FIG. 1, receives subsequent sample requests, the modified image data is returned to the web application as a video stream.

Step 510 is directed to receiving confirmation that the function call executed. Step 512 determines whether there is a next function call. If there is a next function call, step 512 return to step 506. If there are no more function calls, the step 512 proceed to step 514. Step 514 refers to terminating the steps described in FIG. 5.

Figure 6:
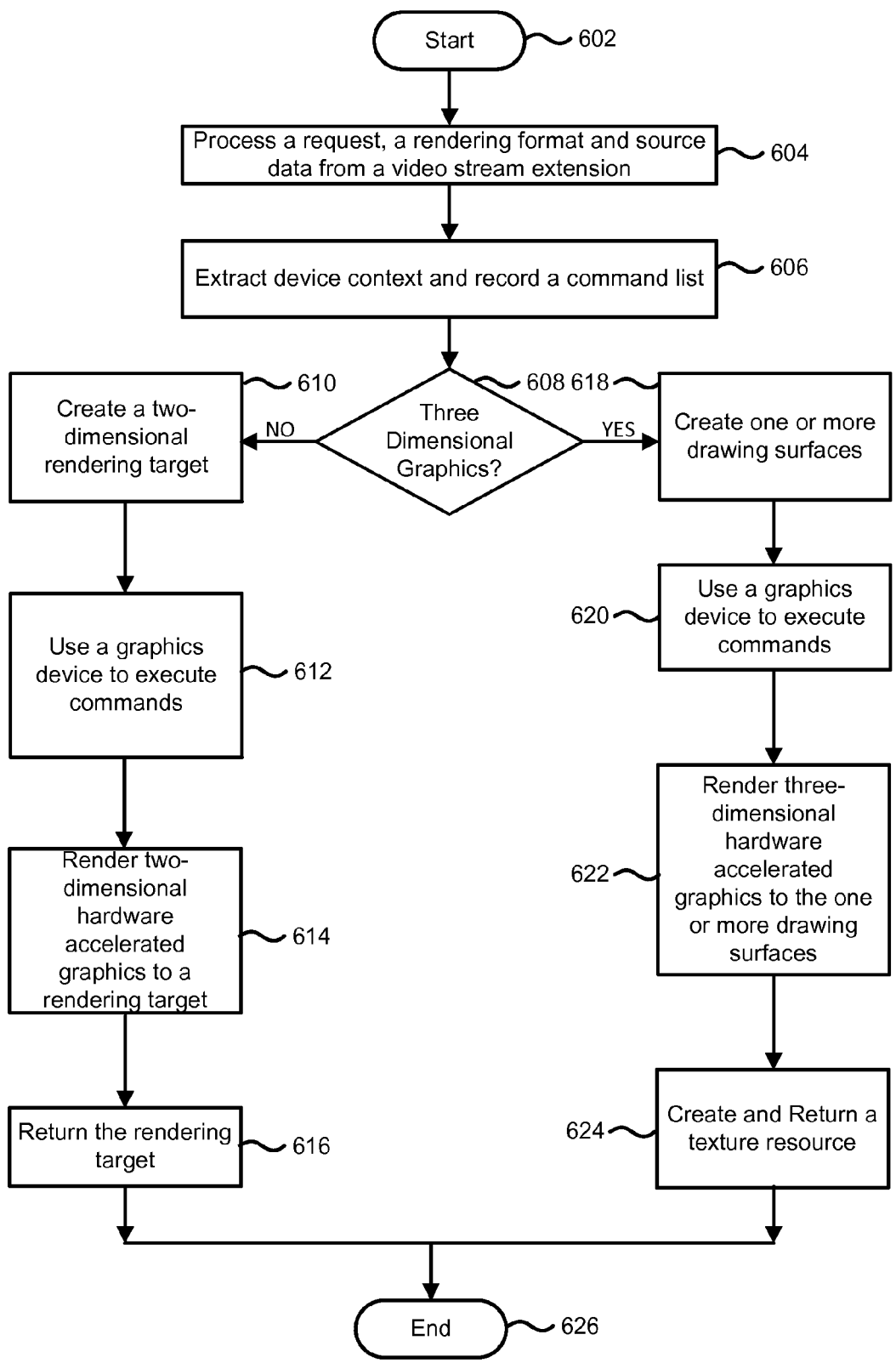
FIG. 6 is a flow diagram illustrating exemplary steps for rendering hardware accelerated graphics for a web application according to one example implementation.

FIG. 6 is a flow diagram illustrating exemplary steps for rendering hardware accelerated graphics for a web application according to one example implementation. Steps depicted in FIG. 6 commence at step 602 and proceed to step 604 when the graphics component 106 processes a request from a rich-Internet application via a video stream extension. The graphics component 106 also receives a source data associated with a particular file type and a format for rendering video frames that represent the source data.

Step 606 is directed to extracting a device context from the graphics device and recording hardware accelerated graphics operations into a command list. In one exemplary implementation, the command list may refer to GPU rendering commands that, when executed on the source data, produces hardware accelerated graphics. Step 608 determines whether to produce three-dimensional graphics for the web application. If the graphics component is to produce the three-dimensional graphics, the steps described in FIG. 6 proceed to step 610. If the graphics component is to produce two-dimensional graphics, the steps described in FIG. 6 proceed to step 618.

Step 610 represents the creation of a two-dimensional rendering target. In one exemplary implementation, the graphics component 106 creates the two-dimensional rendering target that maps to specific areas of the GPU. Step 612 refers to using the graphics device to execute the command list on the rendering target. In one exemplary implementation, the graphics component 106 receives two-dimensional hardware accelerated graphics from the graphics device. Step 614 refers to rendering the two-dimensional hardware accelerated graphics onto the two-dimensional rendering target. Step 616 refers to returning the two-dimensional rendering target to the video stream extension.

Step 618 refers to creating one or more drawing surfaces. A typical drawing surface represents a rectangular pixel area and usually resides in the display memory within the graphics device. In one exemplary implementation, each drawing surface may be a rendering target for a video processor. Step 620 refers to using the graphics device to execute the command list on the one or more drawing surfaces. Step 622 refers to rendering the three-dimensional hardware accelerated graphics onto the one or more drawing surfaces.

Step 624 refers to creating a texture resource and then, returning the texture resource to the video stream extension. In one exemplary implementation, the graphics component 106 creates a two-dimensional texture resource if there is only one drawing surface. In another exemplary implementation, the graphics component 106 creates a two-dimensional texture array comprising a plurality of drawing surfaces. Alternatively, the graphics component 106 creates a surface buffer to manage the one or more drawing surfaces. The two-dimensional texture array may enable the graphics component 106 to add video effects, draw geometry and/or blend two or more of the drawing surfaces. Optionally, the graphics component 106 may return the one or more drawing surfaces. Step 626 refers to terminating the steps described in FIG. 6.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
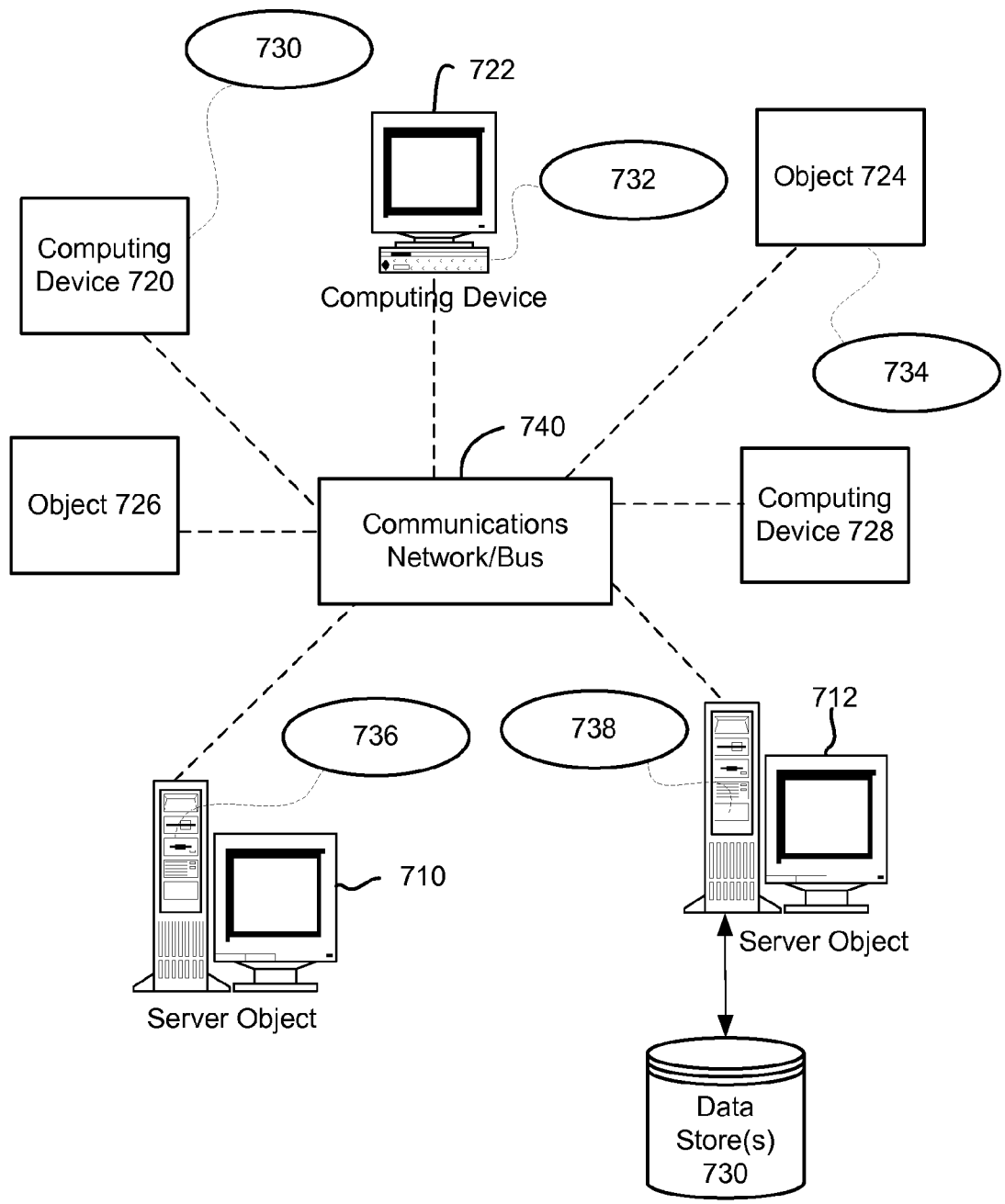
FIG. 7 is a block diagram representing exemplary non-limiting networked environments in which various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
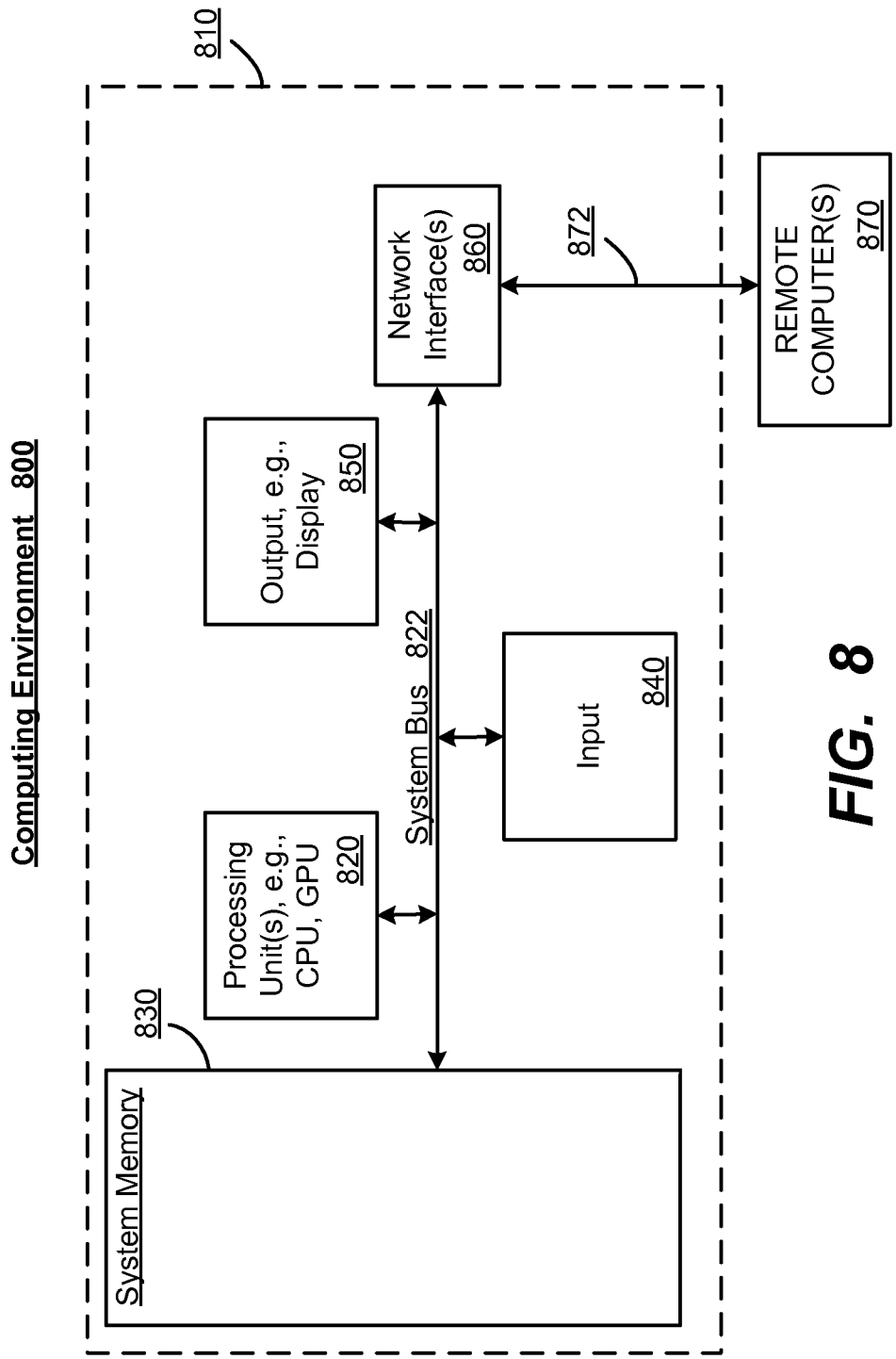
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
   providing a web application with access to a graphics device to perform hardware accelerated graphics operations on source data for a file type that is not supported by a media platform for the web application, including establishing a rendering format for each video frame, and identifying a graphics component that is an application-specific rendering component for the file type, for rendering image data via the hardware accelerated graphics operations, wherein the graphics component is coupled to the graphics device, and wherein a video stream extension routes video sample requests from the web application to the graphics component by bypassing inappropriate media transforms on the media platform in response to the web application requesting a set of video frames for the file type;
   transforming the image data into the set of video frames in accordance with the rendering format and
   communicating the set of video frames to a display device.

2. The method of claim 1, wherein identifying the graphics component further comprises:
   using the graphics device to produce hardware accelerated graphics.

3. The method of claim 1, wherein identifying the graphics component further comprises:
   instructing the graphics component to render hardware accelerated graphics to a resource.

4. The method of claim 3, wherein instructing the graphics component further comprises:
   responsive to user interaction, modifying the hardware accelerated graphics using the graphics device and rendering the hardware accelerated graphics to another resource.

5. The method of claim 1, wherein identifying the graphics component further comprises instructing the graphics component to render hardware accelerated three-dimensional graphics onto one or more drawing surfaces.

6. The method of claim 5, wherein identifying the graphics component further comprises creating a texture resource to manage the one or more drawing surfaces.

7. The method of claim 5 further comprising:
   allocating a video sample using each drawing surface; and
   setting a duration for the video sample.

8. The method of claim 1, wherein establishing the rendering format further comprises:
   providing an interface for controlling the graphics component.

9. The method of claim 8 further comprising:
instructing the graphics component to modify the image data when an interface function is invoked.

10. The method of claim 8 further comprising:
instructing the graphics component to modify the image data when an interface function is invoked, including using the graphics device to produce modified hardware accelerated graphics according to the interface function, and rendering the modified hardware accelerated graphics to the image data.

11. A system comprising:
a web application with access to a graphics device, the graphics device configured to perform hardware accelerated graphics operations on source data for a file type that is not supported by a media platform for the web application, including establishing a rendering format for each video frame;
one or more graphics components, each of the one or more graphics components associated with a specific file type for rendering image data via the hardware accelerated graphics operations, the graphics device identifying a first graphic component that is an application-specific rendering component for the file type, wherein the first graphics component is coupled to the graphics device; and
a video stream extension configured to route video sample requests from the web application to the first graphic component by bypassing inappropriate media transforms on the media platform in response to the web application requesting a set of video frames for the file type, wherein the image data is transformed into the set of video frames in accordance with the rendering format responsive to the web application request, and wherein the set of video frames are sent for display to a display device.

12. The system of claim 11, wherein the graphics component is further configured to use the graphics device to process the source data into one set of hardware accelerated graphics and render the set of hardware accelerated graphics to a set of video frames in accordance with a rendering format that is defined by the video stream extension.

13. The system of claim 11, wherein the one or more graphics components are configured to render hardware accelerated graphics to a resource.

14. The system of claim 11, further comprising:
an interaction component configured to receive user interaction, wherein the first graphics component, responsive to a function call to the interaction component, is further configured to use the graphics device to produce another set of hardware accelerated graphics, and to render the other set of hardware accelerated graphics to another set of video frames.

15. The system of claim 11, wherein the hardware accelerated graphics operations generate hardware accelerated three-dimensional graphics.

16. The system of claim 11, wherein the graphics device is further configured to instruct the graphics component to render hardware accelerated three-dimensional graphics onto one or more drawing surfaces.

17. One or more tangible computer storage devices having computer-executable instructions, which when executed by a computer cause the computer to perform operations, comprising:
providing a web application with access to a graphics device to perform hardware accelerated graphics operations on source data for a file type that is not supported by a media platform for the web application
receiving a video sample request from a web application;
establishing a rendering format corresponding to the file type for each video frame associated with the video sample request;
identifying a graphics component coupled to the graphics device, wherein the graphics component is an application-specific rendering component for the file type for rendering image data via the hardware accelerated graphics operations, including bypassing inappropriate media transforms on the media platform;
transforming image data associated with the source data into a set of video frames in accordance with the rendering format corresponding to the file type, including performing hardware accelerated graphics operations on the source data; and
communicating the set of video frames to a display device.

18. The one or more computer storage devices of claim 17 having further computer-executable instructions comprising:
providing an interaction component that projects an interface for interacting with the image data.

19. The one or more computer storage devices of claim 17 having further computer-executable instructions comprising:
rendering three-dimensional hardware accelerated graphics to one or more drawing surfaces.

20. The one or more computer storage devices of claim 17 having further computer-executable instructions comprising:
rendering three-dimensional hardware accelerated graphics to a first drawing surface;
modifying the three-dimensional hardware accelerated graphics in response to an animation function call;
rendering the modified three-dimensional hardware accelerated graphics to a second drawing surface; and
repeating the modifying step and the rendering step for a duration of the animation function call.

* * * * *